United States Patent [19]
Shih

[11] Patent Number: 5,945,603
[45] Date of Patent: Aug. 31, 1999

[54] VIBRATION DETECTOR ADAPTED FOR USE IN A VIBRATION MEASURING DEVICE

[76] Inventor: David Shih, 84-4, Lane 93, Tungning Road, Tainan, Taiwan

[21] Appl. No.: 09/104,058

[22] Filed: Jun. 24, 1998

[51] Int. Cl.[6] .................................................. G01N 29/04
[52] U.S. Cl. ........................................ 73/652; 73/40.5 A
[58] Field of Search ............................. 73/591, 652, 661, 73/654, 40.5 A, 649; 181/131; 381/58, 67

[56] References Cited

U.S. PATENT DOCUMENTS

| | | | |
|---|---|---|---|
| 5,379,643 | 1/1995 | Taylor | 73/654 |
| 5,546,809 | 8/1996 | Cotton | 73/661 |

*Primary Examiner*—Christine K. Oda
*Attorney, Agent, or Firm*—Pro-Techtor International Services

[57] ABSTRACT

A vibration detector includes a casing, a vibration sensor mounted within the casing, a magnet holder fastened to one end of the casing, the magnet holder holding a magnet for securing the casing to a metal device for detecting vibration, and a vibration probe used for transmitting vibration from a non-metal device to the casing, wherein the magnet holder has a coupling groove in front of the magnet; the vibration probe has a metal mounting block fixedly mounted on a rear end thereof for connection to the magnet holder, the metal mounting block having a coupling flange for engaging into the front coupling groove in the magnet holder, permitting the metal mounting block to be attracted by the magnet.

3 Claims, 5 Drawing Sheets

VIBRATION DETECTOR ADAPTED FOR USE IN A VIBRATION MEASURING DEVICE

BACKGROUND OF THE INVENTION

The present invention relates to vibration detectors for vibration measuring instruments, and more particularly to such a vibration detector that can be conveniently arranged between two different forms for use in different conditions.

In chemical works, vibration measuring instrument are commonly used with vibration detector means to monitor vibrations of mechanical devices, pipes, etc. A vibration measuring instrument for this purpose is generally used with a vibration detector. The vibration detector detects vibration from a device of a chemical equipment, and then transmits detected result to the connected vibration measuring instrument. When severe vibrations occur, the detected mechanical devices, pipes, etc., must be stopped or closed, and then quickly checked to prevent the occurrence of an accident. FIG. 1 shows a vibration detector 10 connected to a vibration measuring instrument 101, and attached to a metal mechanical device 50 of a chemical equipment by means of a magnet holder 20 (see FIG. 2). The magnet holder 20 holds a magnet 40 for securing to a metal device of a chemical equipment, and has a screw rod raised from the rear side thereof for threading into a screw hole on the front end of the vibration detector 10 (see FIG. 2). For detecting vibration of a non-metal device 60 of a chemical equipment (see FIGS. 3 and 4), the magnet holder 20 is disconnected from the vibration detector 10, and then a vibration probe 30 is fastened to the front end of the vibration detector 10 by threading the rear screw rod of the vibration probe 30 into the screw hole on the front end of the vibration detector 10. Because the magnet holder 20 must be disconnected from the vibration probe 30 before installation of the vibration probe 30, much time is wasted in installing the vibration probe 30.

SUMMARY OF THE INVENTION

The present invention has been accomplished to provide a vibration detector which eliminates the aforesaid problem. According to the present invention, the vibration probe has a metal mounting block at the rear end. By means of the metal mounting block, the vibration probe can be directly secured to the magnet holder by a magnetic attractive force. Therefore, when the vibration probe is to be used, it is not necessary to disconnect the magnet holder from the vibration detector. Further, a coupling groove may be provided at the magnet holder for engagement with a coupling flange at the mounting block of the vibration probe.

DETAILED DESCRIPTION OF THE PREFERRED EMBODIMENT

Figure 1:
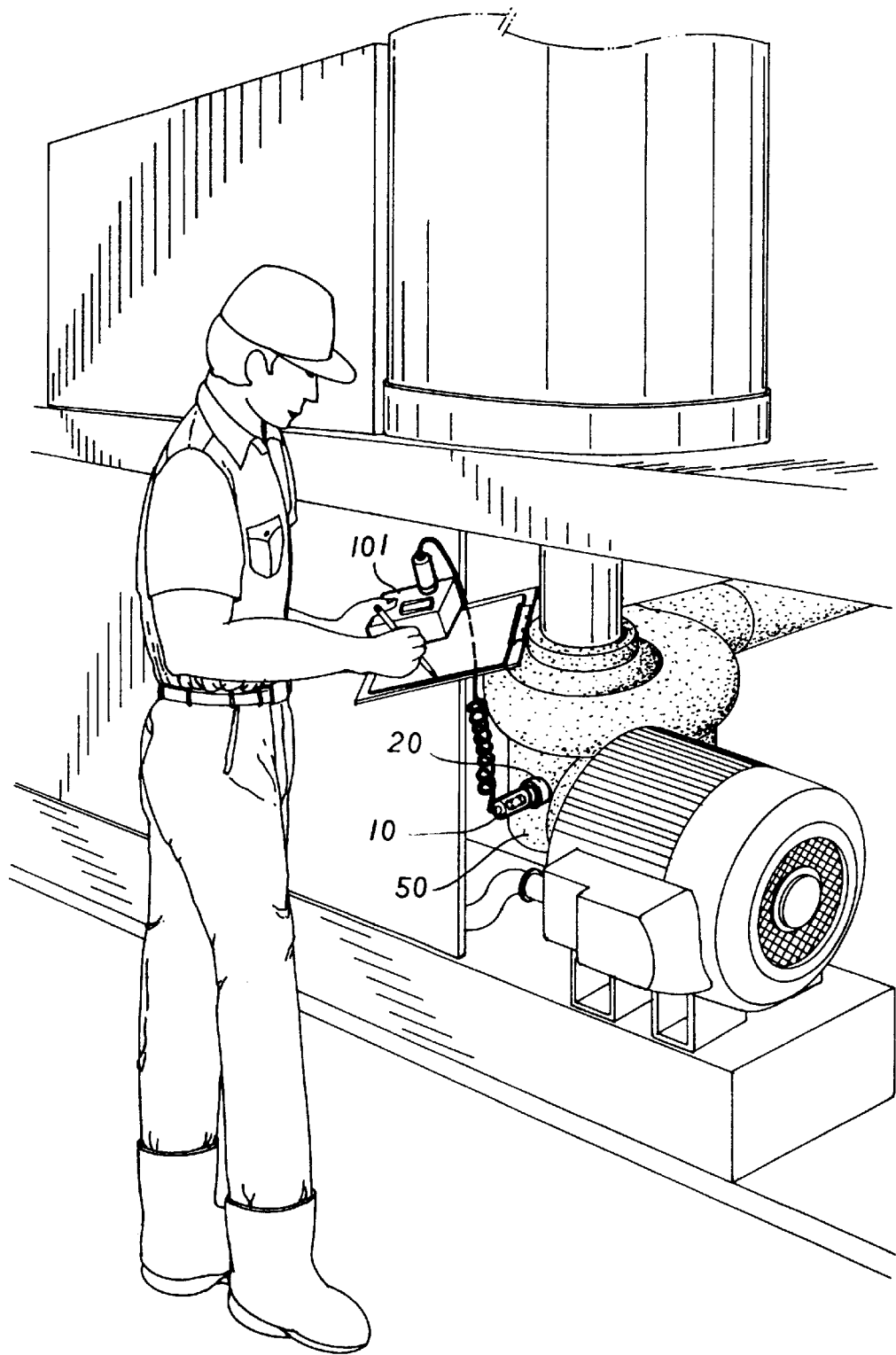
FIG. 1 is an applied view of a vibration detector according to the prior art.
Figure 2:
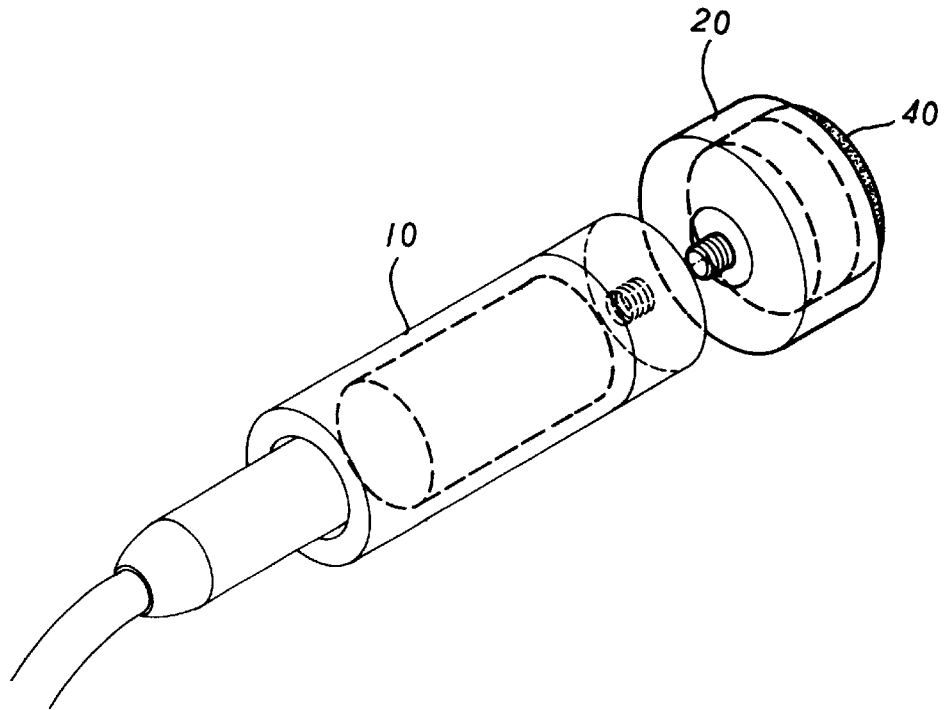
FIG. 2 is a perspective view of a vibration detector according to the prior art (the vibration probe excluded).
Figure 3:
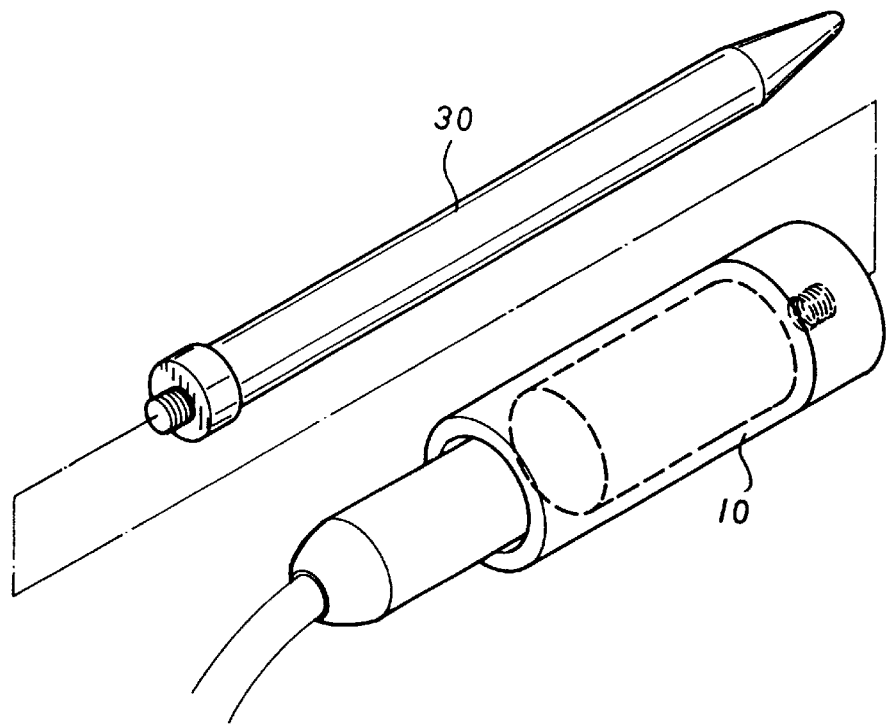
FIG. 3 shows the relation between the casing and the vibration probe according to the prior art.
Figure 4:
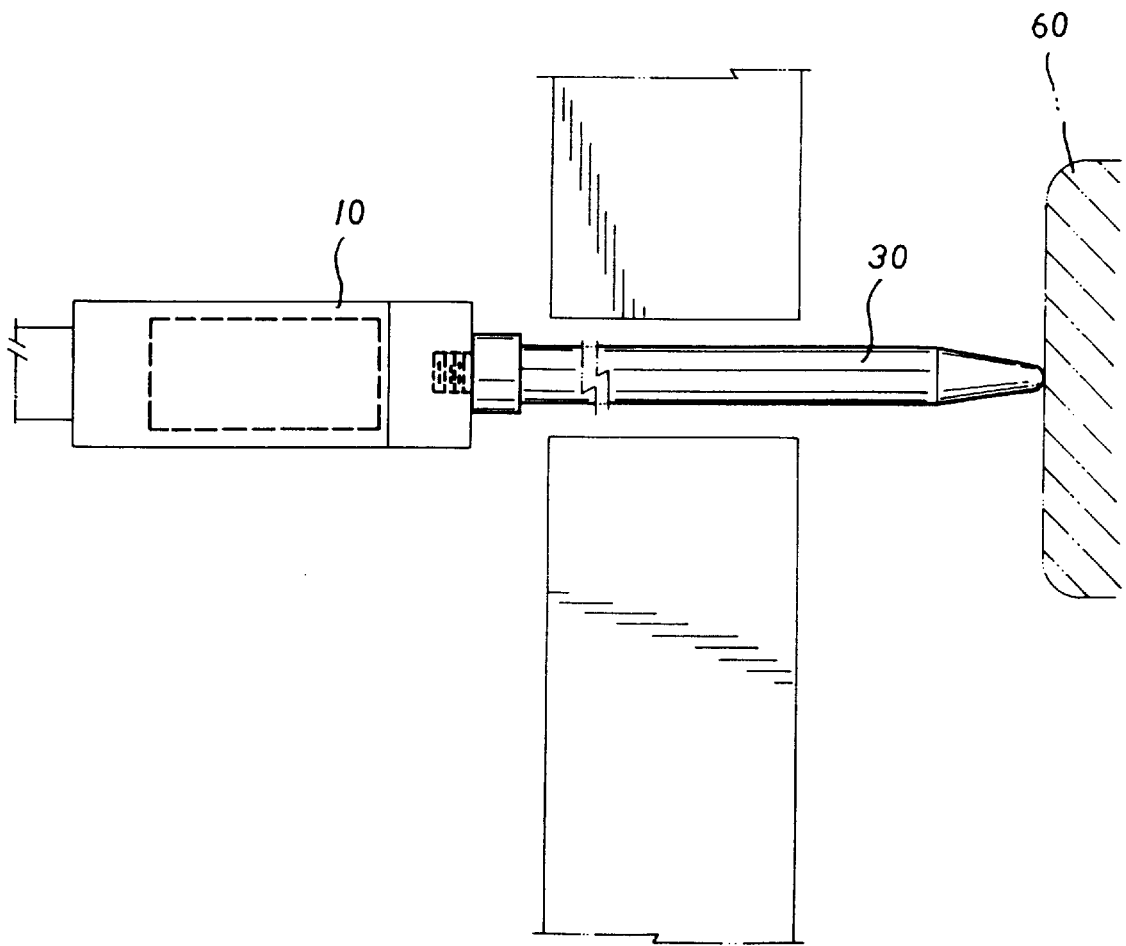
FIG. 4 is another applied view of the vibration detector according to the prior art.
Figure 5:
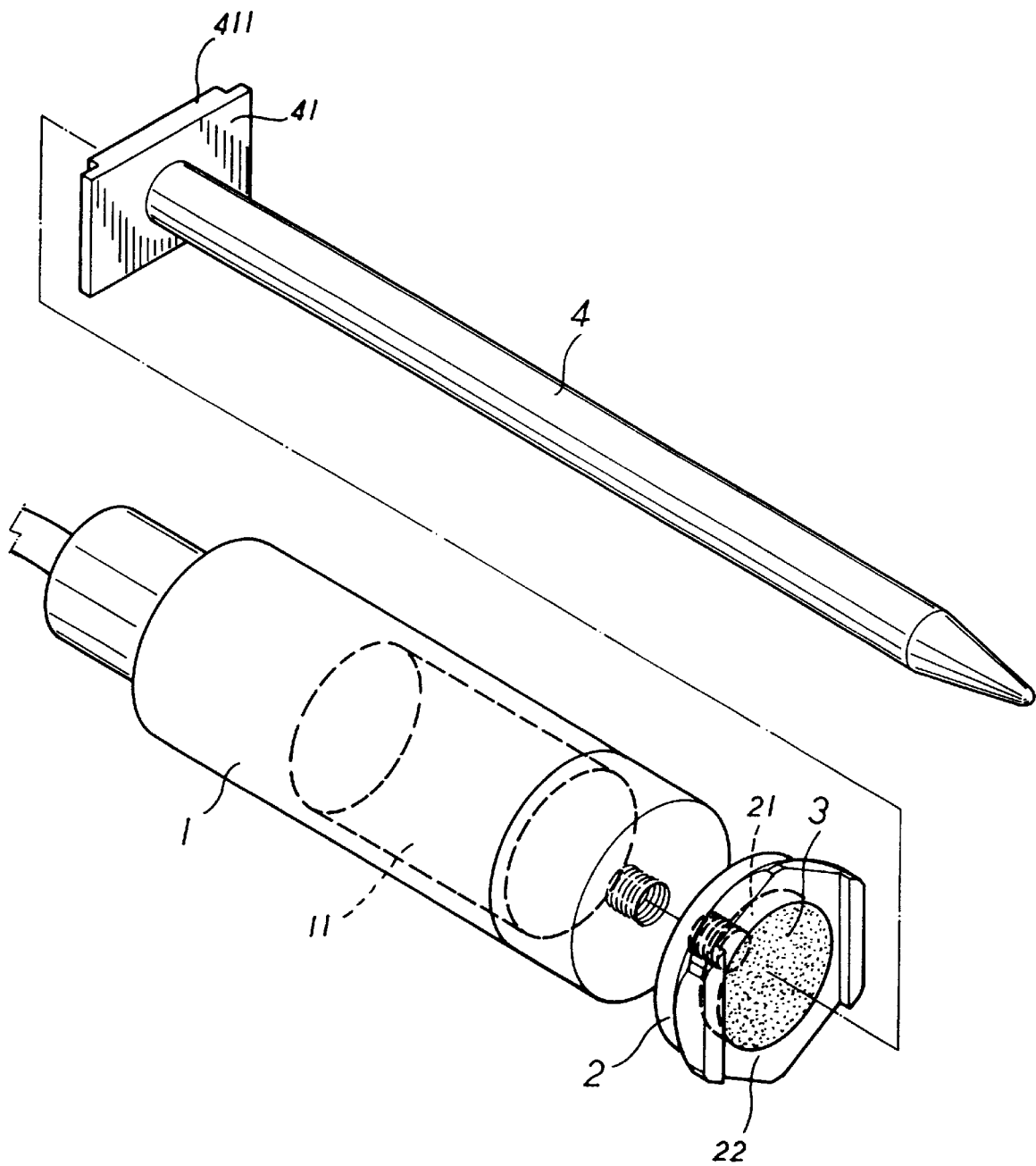
FIG. 5 is an exploded view of a vibration detector according to the present invention.
Figure 6:
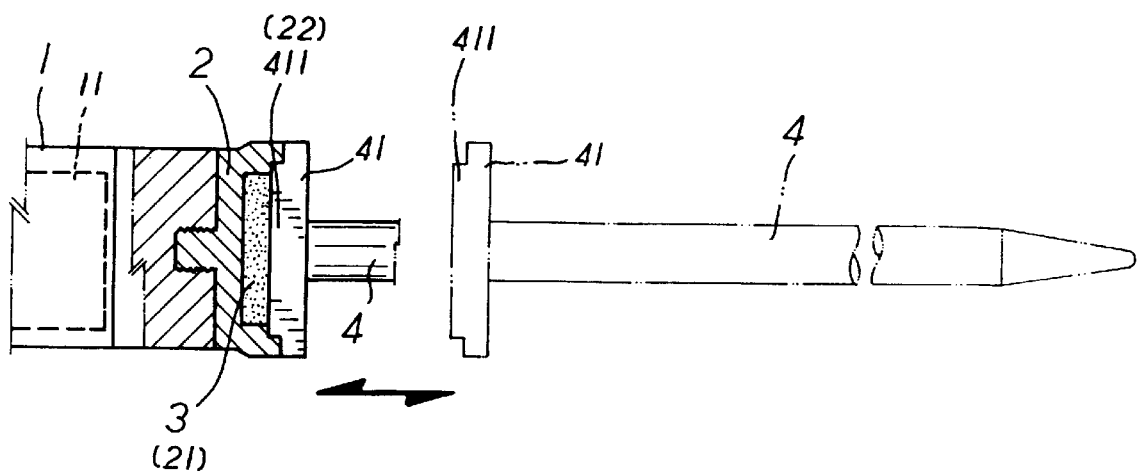
FIG. 6 is schematic drawing showing the connection between the vibration probe and the magnet holder according to the present invention.

Referring to FIGS. 5 and 6, a vibration detector for a vibration measuring instrument in accordance with the present invention is generally comprised of a casing 1, a vibration sensor 11 mounted within the casing 1, a magnet holder 2 fastened to the casing 1 at one end, and a vibration probe 4 detachably secured to the magnet holder 2.

The magnet holder 2 has a front recessed hole 21, which holds a magnet 3, and a front coupling groove 22 in front of the front recessed hole 21. The vibration probe 4 has a rear end fixedly mounted with a metal mounting block 41. The mounting block 41 has a coupling flange 411 for engagement with the front coupling groove 22 of the magnet holder 2. By forcing the coupling flange 411 of the metal mounting block 41 into engagement with the front coupling groove 22 in the magnetic holder 2, the metal mounting block 41 is firmly secured to the magnet holder 2 and attracted by the magnet 3.

When the vibration probe 4 is removed from the magnet holder 2, the magnet holder 2 can be directly attached to the metal wall of a machine part or a piping, enabling the vibration sensor 11 to detect vibration. When detecting the vibration of a non-metal device, the probe 4 is used and secured to the magnet holder 2, enabling vibration waves to be transmitted from the detected device to the vibration sensor 11 through the vibration probe 4, the magnet holder 2 and the casing 1.

While only one embodiment of the present invention has been shown and described, it will be understood that various modifications and changes could be made thereunto without departing from the spirit and scope of the invention disclosed.

What the invention claimed is:

1. A vibration detector comprising a casing, a vibration sensor mounted within said casing, a magnet holder fastened to one end of said casing, said magnet holder holding a magnet for securing said casing to a metal device for detecting vibration, and a vibration probe used for transmitting vibration from a non-metal device to said casing, wherein said vibration probe has a metal mounting block fixedly mounted on a rear end thereof for connection to said magnet holder by magnetic attraction.

2. The vibration detector of claim 1 wherein said magnet holder has a front recessed hole, which receives said magnet.

3. The vibration detector of claim 2 wherein said magnet holder has a front coupling groove in front of said front recessed hole; said metal mounting block of said vibration probe has a coupling flange for engaging into the front coupling groove in said magnet holder, permitting said metal mounting block to be attracted by said magnet.

* * * * *